Feb. 15, 1955 K. O. BOWER 2,702,331
OVERTRAVEL COMPENSATING LINK WITH SAFETY SPRING
Filed April 22, 1952

Inventor
Kendall O. Bower
By Willits, Helwig & Baillie
Attorneys

United States Patent Office 2,702,331
Patented Feb. 15, 1955

2,702,331

OVERTRAVEL COMPENSATING LINK WITH SAFETY SPRING

Kendall O. Bower, Western Springs, Ill., asssignor to General Motors Corporation, Detroit, Mich., a corporation of Delaware Application April 22, 1952, Serial No. 283,719

7 Claims. (Cl. 200—166)

This invention relates generally to flexible couplings and more particularly to flexible couplings provided with an over-travel compensating link.

In many instances it is necessary to provide a linkage between a driving and driven member which will impart movement to the driven member that is substantially the same as the movement of the driving member. In many cases, however, the driving member becomes misaligned so that its movement is no longer the same as that of the driven member or else the driving member has a tendency to over-travel or move beyond the point where the driving member normally imparts the proper movement to the driven member. Some attempts have been made to overcome these problems by using a compressible helical spring to transmit movement of a driving member to a driven memeber. These attempts have not been successful and in fact have raised an added problem, namely, that when the helical spring breaks, the broken portions wind upon themselves destroying any operativeness the coupling might have had.

It, therefore, is an object of this invention to provide a flexible coupling which will compensate for the misaligned movement of a driving member and transmit proper movement to the driven member.

It is a further object of this invention to provide a flexible coupling which will compensate for any over-travel of the driving member and will transmit proper movement to the driven member.

It is a further object of this invention to operatively connect a driving member and a driven member by means of a helical spring, and to further provide means in combination with the driving and driven members, whereby if said spring should break it will still operatively transmit movement from the driving member and impart correct movement to the driven member.

It is a further object of this invention to provide a single unitary structure which will accomplish all three of the above mentioned objects.

It is a further object of this invention to provide a structure which is simple and inexpensive to manufacture and uses a minimum of parts.

The invention will be described in connection with an interlock for connecting and disconnecting electrical circuits.

Figure 1:
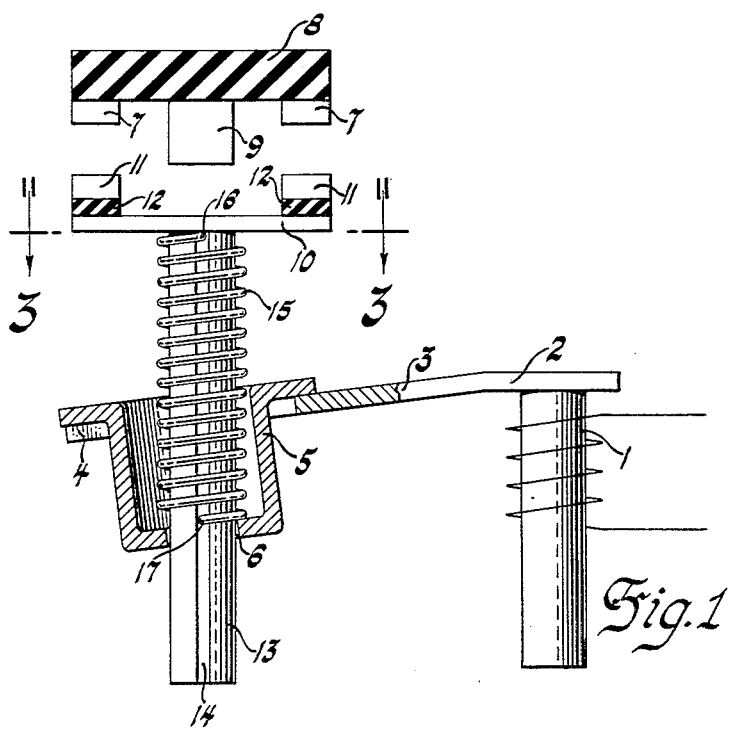
Figure 1 shows a sectional view of a front elevation of the compensating link including driving and driven members, a helical spring, and power means for imparting movement to the driving member.
Figure 3:
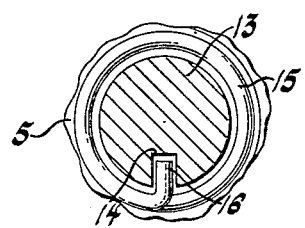
Figure 3 is a view taken along line 3—3 of Figure 1, and shows bent portions of the helical spring residing in the groove of a prolongation fastened to the driven member.

Referring now to Figure 1, a conventional solenoid 1 is shown operatively connected to a driving member 2 for imparting substantially linear movement thereto. The driving member 2 is provided with a lateral arm 3 having bifurcations 4 located at one end thereof. A cup 5 is secured between the bifurcations 4 and provided with a hole 6 located in its bottom.

A pair of sationary contacts 7 are shown attached to an insulator block 8. Also connected to the insulator block to prevent injury to the contacts 7 is a limit stop 9.

A driven member 10 is shown having movable contacts 11 provided thereon and insulated therefrom by small insulator blocks 12. Attached to the driven member 10 is a prolongation 13 which is provided with a groove 14 extending along its length. The prolongation 13 is encircled by the cup 5 and extends through the hole 6 in the bottom thereof. A helical spring 15 is provided with bent portions 16 and 17. The helical spring 15 encircles the prolongation 13 with its bent portions 16 and 17 residing in the groove 14 provided in the prolongation 13. One end of the helical spring 15 abuts the driven member 10. The other end of the helical spring 15 abuts the bottom of the cup 5.

The operation of the coupling is as follows: Upward movement is imparted to the driving member 2 by the solenoid 1. This movement is transmitted through the arm 3, the cup 5 and the helical spring 15 to the driven member 10 causing the driven member 10 to move toward the limit stop 9 until it abuts limit stop 9 and closes the contacts 7 and 11. Any continued movement of driving member 2 will be absorbed by compression of the spring 15. It may also be seen that any misaligned movement on the part of the driving member 2 will not be transmitted to the driven member 10.

Figure 2:
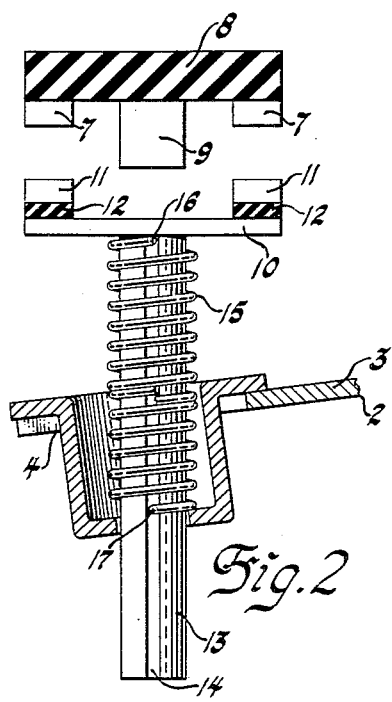
Figure 2 shows a sectional view of a front elevation of the compensating link with the power means removed and the helical spring broken into two pieces.

Referring now to Figure 2, it will be seen how the spring feature of the invention operates should the spring 15 become broken. As the driving member 2 moves upward it will cause the broken portions of the spring 15 to engage each other and impart movement to the driven member 10. The broken portions of the helical spring are restrained from turning upon each other and becoming inoperative by means of the bent portions 16 and 17 residing in the groove 14.

I claim:

1. A driving member, power means operatively connected to said driving member for imparting movement thereto, a driven member having a groove therein, means operatively connecting said driving member and said driven member for imparting movement to said driven member, said means comprising a spring abutting said driving and said driven members and having a plurality of bent portions residing in said groove for movement therealong.

2. A driving member, power means operatively connected to said driving member for imparting movement thereto, a driven member provided with a prolongation having a groove therein, means operatively connecting said driving member and said driven member for imparting movement to said driven member, said means including a helical spring encircling said prolongation and having a plurality of bent portions residing in said groove for movement therealong, one end of said spring abutting said driving member and one end of said spring abutting said driven member.

3. A driving member, power means operatively connected to said driving member for imparting oscillatory movement thereto along a substantially linear path, a driven member, guide means constraining said driven member to movement along a substantially linear path, said paths being substantially parallel to each other, a limit stop to limit the movement of said driven member in one direction along its path, and means operatively connecting said driving and driven members, said means including a lateral arm attached to said driving member and having a bifurcated end, a cup having a hole in the bottom thereof secured to said arm by said bifurcated end, a prolongation attached to said driven member and encircled by said cup and extending through the hole in the bottom of said cup and having a groove extending longitudinally therealong, and a helically wound bar placed between said driving and driven members and having bent portions at each end of said bar residing in said groove for movement therealong, said bar encircling said prolongation, and an end section of said bar abutting said driven member and another end section of said bar abutting the bottom of said cup.

4. A driving member, power means operatively connected to said driving member for imparting movement thereto, a driven member, a helical coil spring operatively connecting said driving and driven members for imparting movement to said driven member, and means to prevent rotation of the ends of said spring with respect to said driving and driven members.

5. In an interlock for connecting and disconnecting electrical circuits, a pair of contacts adapted to engage and disengage with each other, a driven member to which one of said contacts is attached, said driven member having a groove provided therein, a driving member, power means operatively connected to said driving member for imparting movement thereto, means operatively connecting said driving member and said driven member for imparting movement to said driven member, said means comprising a spring abutting said driving and said driven members and having a plurality of bent portions residing in said groove for movement therealong.

6. A driving member and a driven member having a helical coil compressive spring link coacting therebetween to transmit movement of said driving member to said driven member, and means to prevent relative rotation of the ends of said spring link about the axis of said spring so that if said spring link should break intermediate the ends thereof the broken pieces of said spring link will continue to act as a compressive spring link between said members.

7. A switch including a stationary contact, a movable contact, said movable contact having attached thereto a depending shank with an elongated groove in the surface thereof, a spring seat around said shank, means to impart movement to said seat in the direction of said stationary contact and along said shank relative to said shank, an elongated member wound to form a helical spring, said spring being interposed between said movable contact and said spring seat with the helixes of said spring encircling said shank and the ends of said spring abutting said stationary contact and said spring seat, the ends of said member movably residing in said groove to prevent relative rotation between the ends of said spring.

References Cited in the file of this patent

UNITED STATES PATENTS

| | | |
|---|---|---|
| 1,915,948 | Pedrazzo | June 27, 1933 |
| 1,924,604 | Gray | Aug. 29, 1933 |
| 2,531,025 | Bradley | Nov. 21, 1950 |
| 2,583,139 | Ellis | Jan. 22, 1952 |